United States Patent [19]
Prost

[11] Patent Number: 4,801,320
[45] Date of Patent: Jan. 31, 1989

[54] METHOD FOR THE MANUFACTURE OF VACUUM TUBE BASES AND DEVICE FOR THE APPLICATION OF THIS METHOD

[75] Inventor: Alain Prost, Villeurbanne, France

[73] Assignee: Videocolor, Montrouge, France

[21] Appl. No.: 41,067

[22] Filed: Apr. 22, 1987

[30] Foreign Application Priority Data

Apr. 25, 1986 [FR] France ................................ 86 06028

[51] Int. Cl.[4] ............................................. C03B 27/02
[52] U.S. Cl. .................................. 65/59.25; 65/59.28; 65/140; 65/155; 445/28; 445/35; 445/44
[58] Field of Search .................. 65/59.1, 59.25, 59.26, 65/59.28, 59.7, 129, 140, 155; 445/28, 35, 36, 44

[56] References Cited

U.S. PATENT DOCUMENTS 2,340,879 2/1944 Horn ....................................... 65/23
3,257,708 6/1966 Stricker ................................ 65/155
3,276,854 10/1966 Felker et al. .......................... 65/139
3,355,274 11/1967 Patriarche et al. ..................... 65/23
3,551,127 12/1970 Stoll .................................... 65/155
4,341,545 7/1982 Hale ..................................... 65/155

FOREIGN PATENT DOCUMENTS 856652 8/1940 France .

*Primary Examiner*—Robert L. Lindsay
*Attorney, Agent, or Firm*—Oblon, Fisher, Spivak, McClelland & Maier

[57] ABSTRACT

A method for the manufacture of vacuum tube bases wherein to mould bases of electronic tubes shaving conductors of different lengths, a widened opening is made in the upper mould and a distance sleeve with a dead hole is placed in it. This distance sleeve compensates for the difference in length with respect to the longest conductors. Also set forth is a device for application of this method.

3 Claims, 2 Drawing Sheets

METHOD FOR THE MANUFACTURE OF VACUUM TUBE BASES AND DEVICE FOR THE APPLICATION OF THIS METHOD

BACKGROUND OF THE INVENTION

1. Field of the Invention

The present invention pertains to a method for the manufacture of vacuum tube bases for which the internal conductors do not have to be cut after moulding, and to a device for the application of this method.

2. Description of the Prior Art

The manufacturing of bases for vacuum tubes usually comprises two distinct stages. Firstly, the pressing stage, which consists in embedding electrical conductors between two pieces of molten glass and secondly, in moulding the unit thus formed so as to obtain a part with a determined geometry and quality, a part which we shall call a "machine-produced base". To do this operation, the metallic conductors are automatically loaded into housings planned for this purpose in bottom moulds. The glass parts are then loaded into this same mould, and then heated up until they become soft. An upper mould is then pressed onto the glass to shape it. The same heating/pressing operation is then repeated three times in order to obtain a good-quality, finished product. During the pressing operation, a set of independent, mobile weights presses on each of the conductors to keep it at the bottom of its housing. The second stage is the finishing stage, which comprises a number of operations, among them, the cutting of the "internal" parts of the conductors to give them the desired length, these internal parts being those that are subsequently connected to the various electrodes of the vacuum tubes and which generally have different lengths. This cutting operation, during the finishing stage, has a certain number of disadvantages, especially as regards the embrittlement of the glass of the base in the sealing zone through the creation of stresses, and as regards the expense and difficulty of maintaining the cutting tools since the conductors are generally nickel based and are therefore difficult to cut.

SUMMARY OF THE INVENTION

The object of the present invention is to provide a simple and quick method which can be used to avoid the cutting of the conductors during the base-finishing stage.

Another object of the present invention is to provide a device for the application of the method, a device which can be easily integrated into an automatic manufacturing process and which is inexpensive.

The method according to the invention consists in pre-cutting the conductors to the required length, in loading them at suitable positions in a bottom mould of a known type, in arranging the glass parts on the lower mould, in setting an upper mould on top and in arranging, on this upper mould, individual weights above each conductor, if necessary, with interposed distance sleeves, and then in shaping the base in the usual way.

The device of the invention for the manufacture of bases comprises a bottom mould with housings for conductors that go through the bases, an upper mould drilled with holes for the conductors to pass through, corresponding to the housings of the bottom mould, identical widened openings being made coaxially with these holes in the upper surface of the upper mould, distance sleeves being set in these widened openings, and individual weights equal, in number, to the conductors being arranged on the distance sleeves. Depending on the length of the connections, the distance sleeves are not drilled or are drilled with dead holes or through holes, the diameter of which is substantially equal to that of the connections.

DESCRIPTION OF THE DRAWINGS

The present invention will be better understood from the following detailed description of a mode of one embodiment, taken as a non-exhaustive example and illustrated by the appended drawings of which.

DESCRIPTION OF THE PREFERRED EMBODIMENTS

The method and the device for its application, described below, pertain to the manufacture of bases for electronic vacuum tubes such as television cathode tubes, bases comprising several metallic conductors which go through a glass slab. When the bases are finished, the conductors are welded to a set of electrodes or to an electron gun, and the glass slab is welded to an electronic tube bulb or a cathode tube bulb in which a vacuum is created.

Figure 1:
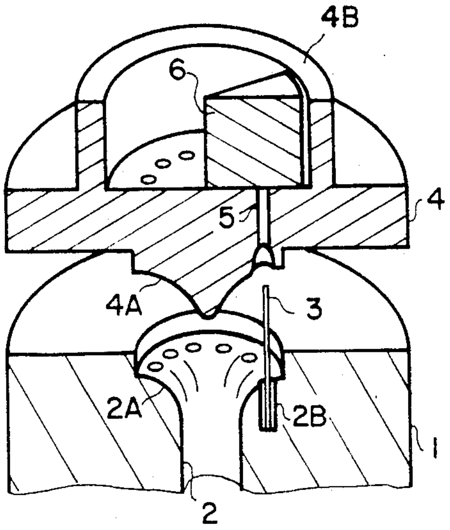
FIG 1 PRIOR ART
FIG. 1 is a cross-section view of a device for manufacturing bases according to the prior art.

In the prior art (FIG. 1), a bottom mould 1 is used with an axial drilled hole 2 at the flared outlet 2A with an appropriate shape, in which are drilled several dead holes 2B all of the same depth, the axes of which are generally equidistant and arranged in the form of a circle. The conductors, such as the conductor 3, which is the only one depicted, are inserted into these dead holes. An upper mould 4, more or less shaped like a disk, having on its lower surface a protuberance 4A with a shape that is substantially complementary to that of the outlet 2A and, on its upper surface, a coaxial, hollow, truncated cylinder 4B with a circular section, the internal diameter of which is greater than the diameter of the circle along which the axes of the holes 2B are set, is placed above the bottom mould 1, the appropriately-shaped glass parts being arranged between these two moulds. The upper mould 4 comprises a series of identical through holes, such as the hole 5, aligned with the holes 2B when the two moulds are in the moulding position, enabling the passage of the conductors 3 which go slightly beyond the upper surface of the mould 4 when the glass parts are positioned. Individual weights 6, shaped like the sectors of thick disks (disks with a diameter which is slightly smaller than the internal diameter of the truncated cylinder 4B and sectors with an angle at the centre which is substantially equal to the angle at the centre of two successive holes 5) are set inside the truncated cylinder 4B, each at one end of the conductor 3.

Figure 2:
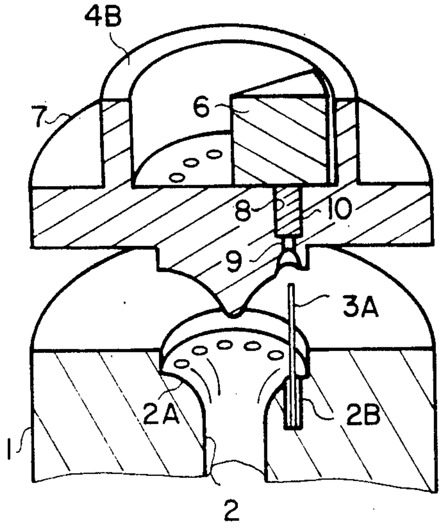
FIGS. 2 to 4 are cross-section views of a device for manufacturing bases according to the invention, using distance sleeves which are solid, having through holes and having dead holes respectively, and, FIG. 5 is a cross-section view of an alternative embodiment of the device according to the invention, using distance sleeves with dead holes.
Figure 3:
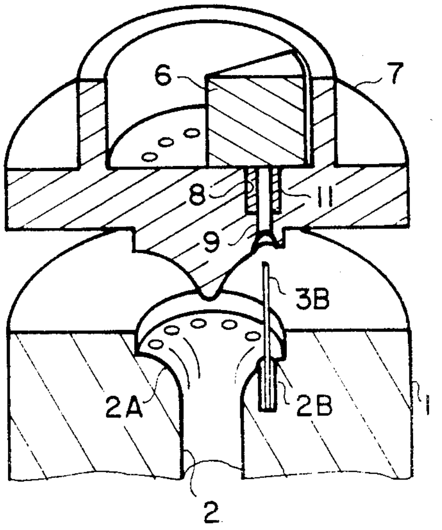
Figure 4:
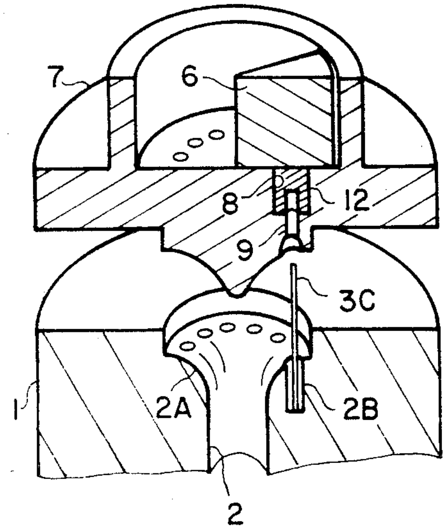

With this type of a known device, bases are obtained for which the lower parts of the conductors all have the same length. Since the electrodes to which these lower parts have to be linked are not all at the same distance from the base, some of these internal parts of the conductors have to be cut. To avoid this cutting operation, which is difficult to perform and expensive, the present invention proposes to pre-cut the conductors and to consequently modify the upper mould, as will be seen below with reference to FIGS. 2 to 4 of the drawing, the lower mould being unmodified. The longest conductors have the reference 3B (FIG. 3) and the shortest have the reference 3A (FIG. 2) and the ones with intermediate lengths have the reference 3C (FIG. 4). To simplify the drawing only one intermediate-length conductor has been depicted, but it is understood that the base may have several conductors with several, different intermediate lengths.

The new upper mould 7 according to the invention has the same shape and the same dimensions as in the prior art, and works together with the same individual weights 6.

On the upper surface of the mould 7, at the same positions as those of the holes 5 of the mould 4, circular widened openings 8 are made, the depth of which is substantially equal to the difference in length between the conductors 3B (the longest ones) and the conductors 3A (the shortest ones). Of course, the thickness of the mould 7 in the region of these widened openings 8 is greater than that of the holes 5. For example, it is greater by at least 6 mm. Coaxially to the widened openings, holes 9 are made with the same diameter as that of the holes 5.

In the widened openings 8 there are distance sleeves (10, 11, 12) which differ according to the length of the conductors (3A, 3B, 3C respectively), in order to compensate for these lengths. For the shortest conductors (3A), these distance sleeves are solid and for the longest conductors, these distance sleeves are each drilled with an axial through hole, the diameter of which is very slightly greater than that of the conductors (like that of the dead holes 2B of the lower mould). These distance sleeves 11 are arranged in the upper mould only in order to position the conductors 3B. For conductors of intermediate length, such as the conductors 3C, there are distance sleeves 12 with an axial dead hole, the depth of which is equal to the difference between these intermediate-length conductors and the length of the shortest conductors. Of course, when the distance sleeves are set in the mould 7, these dead holes are pointed towards the lower mould 1.

Figure 5:
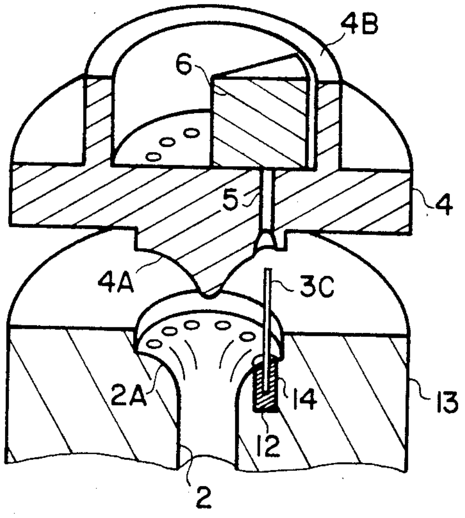

According to the alternative embodiment of the invention depicted in FIG. 5, an upper mould 4 is used which is identical to that of the prior art, but the lower mould 13, which has the same shape and dimensions as the lower mould 1 of the prior art, is drilled with dead holes 14 made along the same axes as the holes 2B. The depth of the holes 14 is slightly greater than that of the widened openings 8, but their diameter is greater than that of the conductors. The diameter of the dead holes 14 is, for example, equal to that recommended above for the widened openings 8. In the dead holes 14, distance sleeves have been set which are similar to those used in the mode of embodiment depicted in FIGS. 2 to 4. For example, in the case of FIG. 5 which refers to an intermediate-length conductor 3C, a distance sleeve 12A is used, similar to the distance sleeve 12 of FIG. 4 but slightly longer than the latter, i.e. with a length which is substantially equal to the depth of the hole 14. For in the case of the shortest conductors, drilled distance sleeves could be used, but then the conductors such as the conductor 3A would be positioned only at their upper end by the holes 5 of the upper mould 4. To avoid this, the distance sleeves used with these shortest conductors are similar to the distance sleeves 12, i.e. they have a dead hole to guide the upper end of these conductors, a method that is possible because, as specified above, the length of the distance sleeves of this alternative mode of embodiment is slightly greater than that of the mode of embodiment of FIGS. 2 to 4. Of course, to compensate for this increase in the depth of the holes of the lower mould, the distance sleeves used with the longest conductors are drilled not with through holes but with dead holes, the depth of which is equal to that of the widened openings 8.

Thus, regardless of the length of the conductors fixed in the glass slab of the base, the upper ends of the longest conductors and/or the upper surfaces of all the distance sleeves 10 to 12 reach practically the same level (i.e. in one and the same plane perpendicular to the common axis of the two moulds 1 and 7), the result of which is that the individual weights 6 play the same role as in the device of the prior art. Of course, the fact that the three dead holes 2B always have the same depth means that those parts of the conductors, which form the connecting pins of the tube to which the machine-produced base will be subsequently welded, are all of the same length, while those parts of the conductors which will be inside the tube have different lengths suited to the connection to the electrodes of this tube.

Obviously, numerous modifications and variations of the present invention are possible in light of the above teachings. It is therefore to be understood that within the scope of the appended claims, the invention may be practiced otherwise than as specifically described herein.

What is claimed is:

1. A method for the manufacture of bases for vacuum tubes, eliminating the need to cut the internal conductors after moulding, which comprises:

pre-cutting the conductors to a desired length and bottom mould;

setting glass parts on the bottom mould;

placing an upper mould above the bottom mould, said upper mould having through-holes provided therein and widened openings coaxially with said through-holes;

positioning a distance sleeve in each of said widened openings of said upper mould so as compensate for a length dimension of each of said conductors for proper positioning of each of said conductors in each of said through holes such that for a short length conductor, said sleeve comprises a solid sleeve, for a long length conductor said sleeve includes an axial through hole and for an intermediate length conductor, said sleeve has a dead hole formed therein;

setting individual weights in said upper mould at an upper end of each of said sleeves; and shaping the base.

2. A device for the manufacture of bases for vacuum tubes, comprising;

a bottom mould having a plurality of through holes formed therein for housing a plurality of conductors of a desired length which extend through the bases;

an upper mould having a plurality of holes formed therein for the conductors to extend into, corresponding to the through holes of the bottom mould, said upper mould defining identical widened openings formed therein coaxially with said holes of the upper mould;

a plurality of distance sleeves respectively positioned in said widened openings for positioning of said plurality of conductors, respectively so as to compensate for a length dimension of each of said conductors for proper positioning of each of said conductors in each of said through holes such that for a short length conductor, said sleeve comprises a solid sleeve, for a long length conductor said sleeve includes an axial through hole and for an intermediate length conductor, said sleeve has a dead hole formed therein; and a plurality of individual weights equal in number to the conductors and set on the sleeves above an upper surface portion of the upper mould.

3. A device for the manufacture of bases for vacuum tubes, comprising:

a bottom mould having a plurality of dead holes formed therein housing of the conductors which extend through the bases;

a plurality of conductors of a desired length respectively positioned in said holes formed in said bottom mould;

an upper mould having a plurality of through holes defined therein for the conductors to go through, the diameter of said through holes being substantially equal to the diameter of the conductors, said through holes being coaxial with the dead holes of the bottom mould, the diameter of the dead holes being greater than that of the conductors and the lower mould also including a plurality of widened openings coaxial with said plurality of through-holes respectively;

a plurality of distance sleeves respectively positioned in said widened openings so as to compensate for a length dimension of each of said conductors for proper positioning of each of said conductors in each of said through holes such that for a short length conductor, said sleeve comprises a solid sleeve, for a long length conductor said sleeve includes an axial through hole and for an intermediate length conductor, said sleeve has a dead hole formed therein; and a plurality of individual weights, equal in number to the conductors, positioned on the conductors above an upper surface portion of the upper mould.

* * * * *